July 25, 1933.   H. E. ELROD   1,919,689
SLUDGE DIGESTION TANK
Filed April 23, 1931   4 Sheets-Sheet 1

July 25, 1933.  H. E. ELROD  1,919,689

SLUDGE DIGESTION TANK

Filed April 23, 1931  4 Sheets-Sheet 2

Inventor
Henry E. Elrod

By Knight Bros.
Attorneys

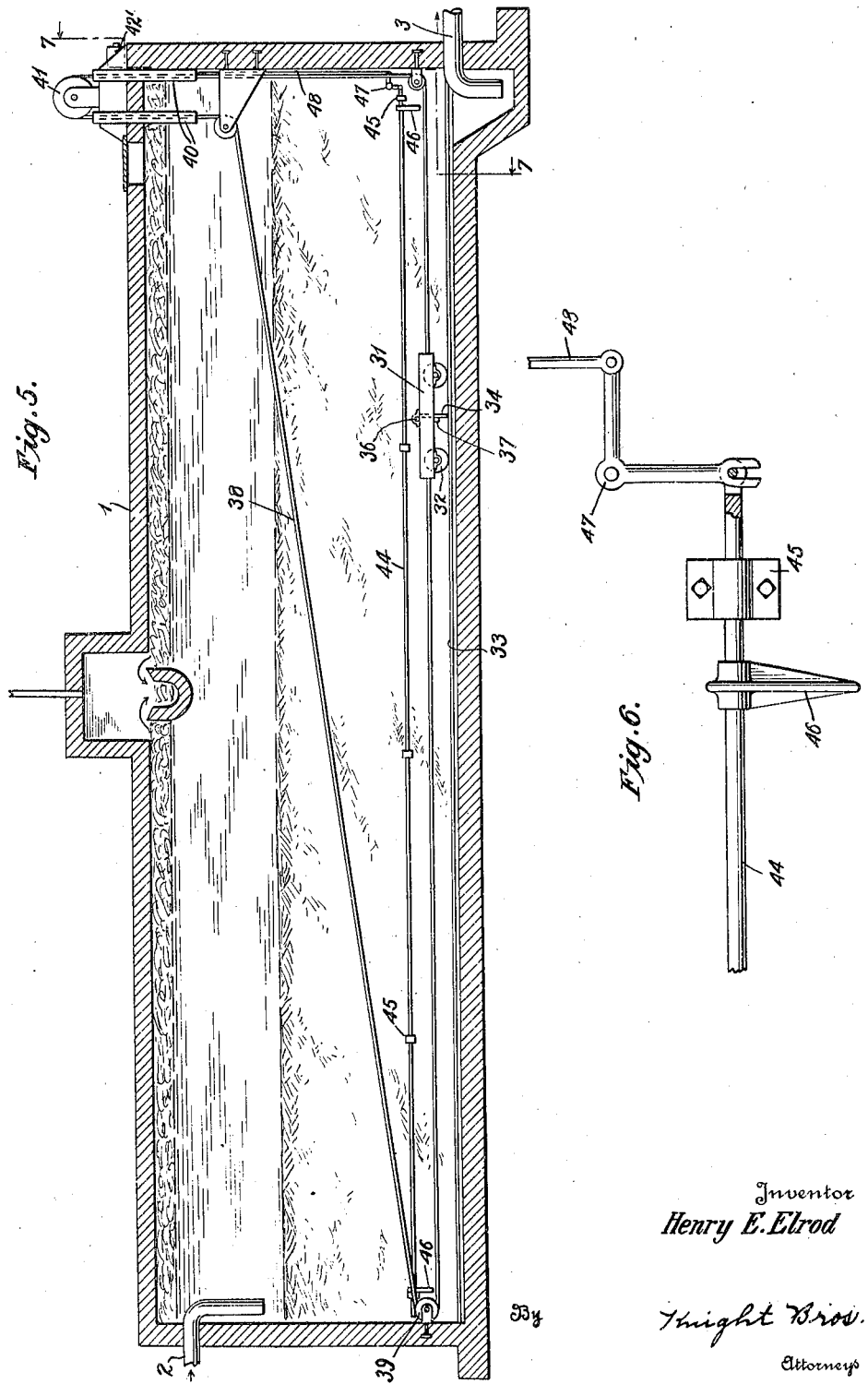

July 25, 1933.  H. E. ELROD  1,919,689
SLUDGE DIGESTION TANK
Filed April 23, 1931  4 Sheets-Sheet 4

Inventor
Henry E. Elrod
By Knight Bros.
Attorneys

Patented July 25, 1933

1,919,689

UNITED STATES PATENT OFFICE

HENRY E. ELROD, OF HOUSTON, TEXAS

SLUDGE DIGESTION TANK

Application filed April 23, 1931   Serial No. 532,375.

This invention relates to an improved digestion tank for treating sludge.

It is an object of my invention to provide a digestion tank which allows the automatic removal of the settled scum and supernatant liquor from the sludge settling chamber upon the admittance of additional sludge.

It is a further object of my invention to provide a novel agitating means in conjunction with a sewage settling chamber to aid the bacterial digestion process that takes place therein.

It is a further object of my invention to provide a settling tank in which the constituent elements derived from sludge may be disposed of conveniently.

Further objects and advantages of my structure will appear from the following detailed description of the embodiments of my invention in conjunction with the accompanying drawings wherein:

Fig. 5 illustrates an alternate form of agitating and removing means for my layer of sludge material, Fig. 6 shows a detailed view of the reversing mechanism structure illustrated in Fig. 5.

Figure 1:
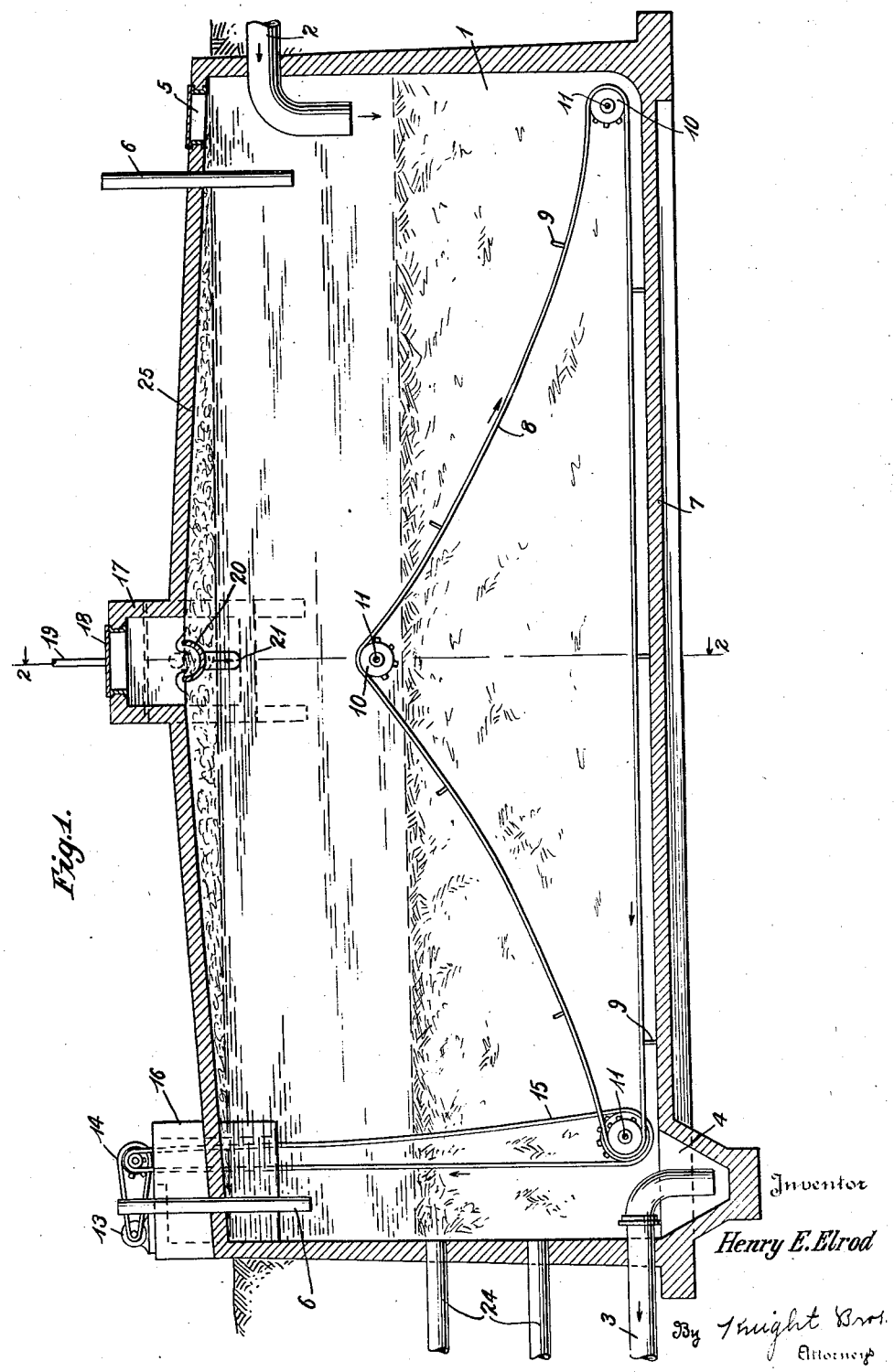
Fig. 1 is a sectional view across the longitudinal axis of my improved tank.

In the drawings is illustrated the rectangular tank 1, adapted to hold sludge for digestion by bacterial action. The sludge may be admitted into the tank through one or more inlet ports 2. One or more conventional outlets 3 are provided for leading away the settled sludge. These may cooperate with hoppers 4 near the outlet end. This tank is also provided with one or more conventional sealed entrance man-holes 5, as well as one or more sludge testing and chemical dosing pipes 6. The floor 7 of my tank may be either flat or slightly sloping from the inlet to the outlet end of the tank.

Figure 2:
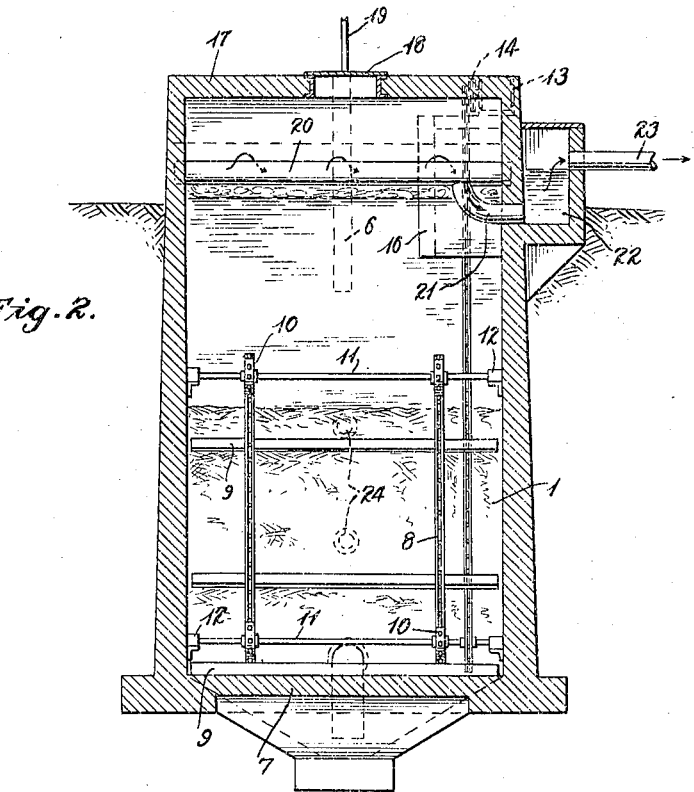
Fig. 2 is a sectional view along line 2—2 of Fig. 1.

As part of my tank structure, I provide an agitating system which I have disclosed in the form of two embodiments. In Fig. 1 this system consists of sprockets 10 mounted on shafts 11 which are in turn mounted transversely of the tank upon suitable bracket members 12, clearly illustrated in Fig. 2. One of these shafts 11 is disposed at each end of the tank adjacent the floor level thereof, with a third one shown at the center of the tank above the sludge level. Chains are adapted to run over these sprockets and suitable "flights" 9, preferably steel channel sections, are connected across these chains and are adapted to extend throughout the width of the tank. Motion, in the direction of the arrows, is imparted to chains 8 by means of a conventional prime mover 13, such as an electric motor, acting through driving connections 14 and chain 15, thereby actuating shaft 11 at the left end of the tank. Box 16 is provided to accommodate the chain or equivalent drive 14, and extends below the roof 25 of the tank to form a seal against the escapement of liquor and gases from within tank 1.

Figure 3:
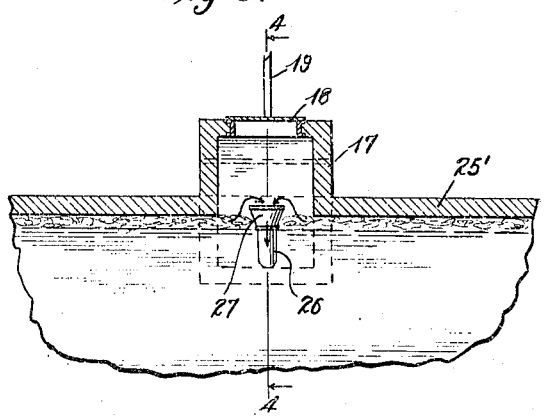
Fig. 3 is a modified showing of the cover structure in conjunction with a flat roof forming the top of my tank.
Figure 4:
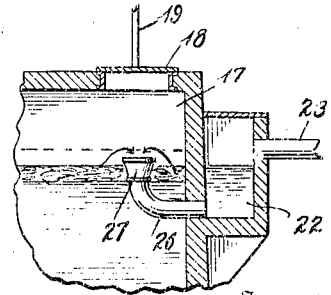
Fig. 4 is a sectional view along line 4—4 of Fig. 3.
Figure 7:
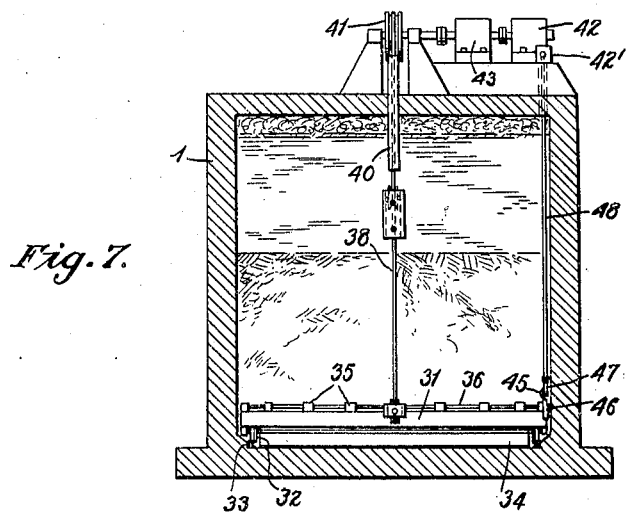
Fig. 7 is a sectional view along line 7—7 of Fig. 5.
Figure 8:
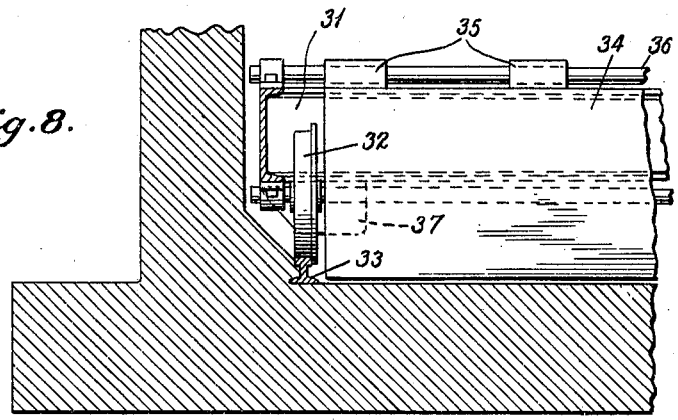
Fig. 8 is a detailed side view of my "buggy" structure mounting.
Figure 9:
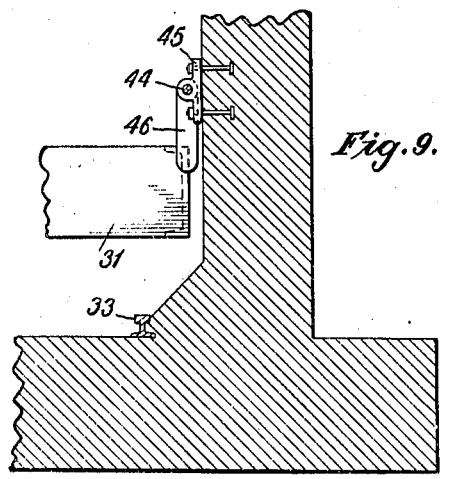
Fig. 9 is a side view of Fig. 6 in conjunction with the "buggy" housing.

My tank is furthermore provided with one or more boxes 17 disposed at the top thereof. Each such box or gas dome is provided with the conventional sealed cover or hood 18, and gas discharge pipe 19 placed therein, or at any other convenient point in the gas dome above the liquor level. In one form of my invention I provide a trough 20 extending transversely of the tank under the gas dome and near the top of the tank. This trough may be made of any suitable material, although concrete is preferable, and may be provided with weir plates of steel or other material. These troughs may be disposed singly or in groups. Each trough 20 is provided with a pipe 21 which connects with a conventional seal trap 22 provided with a discharge pipe 23. For this trough may also be substituted a plurality of upright pipes 26, shown in Fig. 3, with or without flared inlets 27. These pipes may in turn be connected by means of an outlet pipe 21, as is the case with the troughs, with a suitable seal trap and discharge pipe, as illustrated in Fig. 4. The showings of Figs. 3 and 4 show my tank provided with a flat form of roof, which in nowise alters the mode of operation of my system which is as follows. The sludge is admitted to the tank from previously disposed collecting tanks through the inlet port either by means of a gravity or a forced feed. Upon being filled, the resulting process of bacterial digestion takes place, at which time the sludge divides itself into three layers. At the top, is found a layer of scum. Below it is a layer of supernatant liquors, and the lowermost layer is that of sludge. The gases that are evolved during this digestion process rise to the top of the gas domes 17 and are suitably passed off either to the atmosphere or to proper reservoirs by means of pipes 19. After a certain period when the process is completed, additional sludge is admitted into the chamber which results in the forcible raising of the layers of scum and supernatant liquors over the sides of the trough 20 or equivalent elements, thereby automatically removing said liquors for proper distribution and providing room for the new batch to be operated upon. Sludge eduction pipes 24 may be provided in addition to outlet 3 for withdrawing sludge at various elevations.

My process of digesting is greatly aided by intermittently agitating the solid matter in the tank. A conventional form of chain mixer proved impractical in this type of tank, for the reason that such generally consisted of horizontal tracks against the wall of the tank upon which the chain could travel directly from one sprocket to the other at the opposite ends of the tank adjacent the floor level. With this type of movement it was necessary that a tightening device be provided in order to keep the chain taut and prevent it from buckling. In view of the location of such a device, it was inaccessible, and furthermore its mode of operation was difficult to observe. With my arrangement disclosed herein, the chain is kept taut by its weight, suspended from the top sprockets 10, and no tighteners are necessary. The present arrangement also offers the great advantage that the complete layer of sludge is mixed and agitated throughout its depth during the chain movement. With the conventional horizontal chain travel, only that portion of the sludge layer was agitated which extended between the upper and lower flights of the chain.

My agitating system also performs the function of cleaning, since the flights 9 drag the floor 7 of the tank, and when the sludge is being withdrawn, all settled inorganic and other matter will be scraped therefrom. This obviates the necessity for the manual cleaning of the tank which is a very arduous task.

In Figs. 5 to 9, I have illustrated an alternative mode of agitating and removing my settled sludge layer. These figures do not illustrate the other features of the tank shown in detail in Figs. 1 to 4. The agitating element consists of a "buggy" 31 constructed preferably of steel structural members riveted or welded together. The body of this travelling member or "buggy" is mounted on wheels 32 which are adapted to travel upon rails 33 laid on the floor of the tank or suspended from the side walls thereof upon suitable brackets. This travelling member may assume the alternative form of a sled, adapted to slide directly on the floor of the tank and between the walls thereof. A blade or scraper 34 is hinged from the travelling member 31 and extends downwardly to such an extent that it just clears the floor of the tank. Upon the travelling member structure is fixed a stop 37 which is adapted to engage this pivoted member 34 in the direction of travel toward the outlet end, but which will not interfere with the blade 34 when the member travels in the opposite direction. Thus in its movement toward the outlet end, the member 34 will push the sludge in front of it toward that end, whereas upon the reverse movement of the "buggy", it will be free to slide over the sludge.

A flexible member 38, preferably an ordinary round link chain, is fixedly attached to both ends of "buggy" 31 at its center, or optionally two such flexible members may be connected at the two sides of each end. Elements 38 are threaded through "rag" wheels or sheaves 39, the strands of which are anchored into the walls, substantially as shown. Pipes 40 are provided for the flexible member 38 to pass from the inside to the outside of the tank, serving to act as seals to prevent the escape of gases from the tank. Outside of the tank, element 38 passes over a "rag" wheel 41 suitably mounted and connected to any conventional motor or other prime mover 42 connected through an intermediate gear reducer 43, if such is necessary. Of course, element 38 may be actuated by a manually operated winch or equivalent means.

In the case of a motor actuation for element 38, it is necessary that the travelling member or "buggy" 31 be reversed at its limits of travel. For this purpose, a shaft 44 is provided, against one wall of the tank by means of anchors 45, which allow longitudinal motion of shaft 44 therein. Stop pawls 46 are fixedly attached to shaft 44 near the extremities of the tank. The change link for reversing direction is movably attached to the end of shaft 44 and to the wall of the tank. It is connected to the motor switch box 42' by connecting rod 48. The travel of my "buggy" may be controlled to travel continuously or intermittently, as taught in my Patent No. 1,700,791, February 5, 1929, dependent upon operating conditions. By this means, I obtain an efficient agitating as well as ejecting mechanism for my layer of settled sludge.

Having described my invention, I claim:

1. In a sludge digestion tank, an inlet for the reception of liquid sludge, an outlet adjacent the bottom of the tank for the eduction of settled sludge, a gas-tight cover for said tank, a gas collecting dome disposed in and above said cover, means for withdrawing the gases collected in said gas dome, an outlet for supernatant liquor and scum segregated from said liquid sludge disposed within said gas dome and with the mouth thereof above the normal level of the supernatant liquor, and a liquid seal trap for sealing said outlet against the escapement of gases from within the tank and from the ingress of air from the exterior to the interior of the tank.

2. In a sludge digestion tank, an inlet for the reception of liquid sludge, an outlet adjacent the bottom of the tank for the eduction of settled sludge, agitating means for said sludge, a gas-tight cover for said tank, a gas collecting dome disposed in and above said cover, means for withdrawing the gases collected in said gas dome, an outlet for supernatant liquor and scum segregated from said liquid sludge disposed within said gas dome and with the mouth thereof above the normal level of the supernatant liquor, and a liquid seal trap for sealing said outlet against the escapement of gases from within the tank and from the ingress of air from the exterior to the interior of the tank.

3. The combination with a sludge digestion tank as claimed in claim 2 wherein the agitating means for the settled sludge comprises sprocket rollers at extreme ends of said tank adjacent the floor level thereof, a sprocket roller above the sludge level intermediate the extreme ends of said tank, a chain comprising transverse channel elements passing over said rollers, and means for actuating said chain.

4. The combination with a sludge digestion tank as claimed in claim 2 wherein the agitating means for the settled sludge comprises a travelling member, means for actuating said travelling member in two directions, a pivoted plate suspended from the top thereof, a stop element on said member adapted to retain said plate in a vertical position in the course of movement thereof from the entrance to the exit end of said tank, said element being freely pivoted in its reverse direction, and means for reversing the direction of said member at its limits of travel.

HENRY E. ELROD.